(12) United States Patent
Lynch

(10) Patent No.: US 9,404,764 B2
(45) Date of Patent: Aug. 2, 2016

(54) PATH SIDE IMAGERY

(75) Inventor: James D. Lynch, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 678 days.

(21) Appl. No.: 13/340,923

(22) Filed: Dec. 30, 2011

(65) Prior Publication Data

US 2013/0169668 A1 Jul. 4, 2013

(51) Int. Cl.
*G06T 17/05* (2011.01)
*G01C 21/36* (2006.01)
*G01S 17/02* (2006.01)
*G01S 17/89* (2006.01)
*G01S 7/48* (2006.01)
*G06T 3/00* (2006.01)
*G01S 5/16* (2006.01)

(52) U.S. Cl.
CPC ........... *G01C 21/3638* (2013.01); *G01S 7/4808* (2013.01); *G01S 17/023* (2013.01); *G01S 17/89* (2013.01); *G06T 3/005* (2013.01); *G06T 17/05* (2013.01); *G01S 5/16* (2013.01)

(58) Field of Classification Search
CPC ....................................... G06T 17/00
USPC ......................................... 345/419
See application file for complete search history.

(56) References Cited

U.S. PATENT DOCUMENTS

| | | | |
|---|---|---|---|
| 5,070,401 | A | 12/1991 | Salvati et al. |
| 5,790,086 | A | 8/1998 | Zelitt |
| 6,374,182 | B2 | 4/2002 | Bechtolsheim et al. |
| 6,417,850 | B1 | 7/2002 | Kang |
| 6,507,665 | B1 | 1/2003 | Cahill et al. |
| 6,552,744 | B2 | 4/2003 | Chen |
| 6,999,620 | B1 | 2/2006 | Harville |
| 7,003,136 | B1 * | 2/2006 | Harville ........................ 382/103 |
| 7,460,953 | B2 | 12/2008 | Herbst et al. |
| 7,626,596 | B2 | 12/2009 | Kotake et al. |
| 8,334,867 | B1 | 12/2012 | Davidson |

(Continued)

FOREIGN PATENT DOCUMENTS

| | | |
|---|---|---|
| EP | 1584897 A2 | 10/2005 |
| EP | 2 309 463 | 4/2011 |

(Continued)

OTHER PUBLICATIONS

Frueh et al., "Data Processing Algorithms for Generating Textured 3D Building Façade Meshes from Laser Scans and Camera Images," 2005, International Journal of Computer Vision, vol. 61, p. 159-184.*

(Continued)

*Primary Examiner* — Ryan D McCulley
(74) *Attorney, Agent, or Firm* — Lempia Summerfield Katz LLC

(57) ABSTRACT

One or more systems, devices, and/or methods for generating path side imagery are disclosed. For example, a method includes receiving optical data measured in three-dimensional geographic coordinates and image data from at least one image bubble. The optical data is projected onto at least one predefined two-dimensional plane. A pixel value for a point of the optical data on the two-dimensional plane is calculated according to the image data. The pixel value may correspond to color or another graphical attribute. The two-dimensional plane is stored or displayed as street side imagery or other path side imagery. An image file including the pixel value for each point of the optical data may be stored in memory or a map database.

18 Claims, 14 Drawing Sheets

(56) References Cited

U.S. PATENT DOCUMENTS

| | | | |
|---|---|---|---|
| 2002/0176619 | A1 | 11/2002 | Love |
| 2004/0169724 | A1 | 9/2004 | Ekpar |
| 2005/0280661 | A1 | 12/2005 | Kobayashi et al. |
| 2006/0002590 | A1 | 1/2006 | Borak |
| 2006/0072848 | A1 | 4/2006 | Razzano |
| 2006/0184320 | A1 | 8/2006 | Hong |
| 2007/0046448 | A1 | 3/2007 | Smitherman |
| 2007/0076920 | A1 | 4/2007 | Ofek |
| 2007/0233380 | A1 | 10/2007 | Tanaka |
| 2007/0237424 | A1 | 10/2007 | Burg et al. |
| 2008/0143709 | A1* | 6/2008 | Fassero ............ G06T 3/00 344/419 |
| 2009/0027418 | A1 | 1/2009 | Maru et al. |
| 2009/0079738 | A1 | 3/2009 | Liao |
| 2009/0195536 | A1 | 8/2009 | Louise et al. |
| 2009/0292457 | A1 | 11/2009 | Ford et al. |
| 2009/0310867 | A1 | 12/2009 | Matei et al. |
| 2009/0313124 | A1* | 12/2009 | Miranda ............ G01C 21/3647 705/14.58 |
| 2010/0023250 | A1 | 1/2010 | Mays et al. |
| 2010/0204964 | A1 | 8/2010 | Pack et al. |
| 2010/0204965 | A1 | 8/2010 | Ide et al. |
| 2010/0235154 | A1 | 9/2010 | Meurer et al. |
| 2010/0245535 | A1 | 9/2010 | Mauchly |
| 2010/0299065 | A1 | 11/2010 | Mays |
| 2010/0305854 | A1 | 12/2010 | Kammel et al. |
| 2011/0098918 | A1 | 4/2011 | Siliski et al. |
| 2011/0109617 | A1 | 5/2011 | Snook et al. |
| 2011/0109618 | A1 | 5/2011 | Nowak et al. |
| 2011/0141141 | A1 | 6/2011 | Kankainen |
| 2011/0206274 | A1 | 8/2011 | Tateno et al. |
| 2011/0216935 | A1 | 9/2011 | Mays et al. |
| 2011/0246055 | A1 | 10/2011 | Huck et al. |
| 2011/0267440 | A1 | 11/2011 | Kim et al. |
| 2011/0279452 | A1 | 11/2011 | Ibe et al. |
| 2011/0283223 | A1 | 11/2011 | Vaittinen et al. |
| 2011/0289510 | A1 | 11/2011 | Lin et al. |
| 2011/0293180 | A1 | 12/2011 | Criminisi et al. |
| 2011/0310091 | A2* | 12/2011 | Yoshida et al. ............ 345/419 |
| 2011/0313653 | A1 | 12/2011 | Lindner |
| 2012/0044476 | A1* | 2/2012 | Earhart et al. ............ 356/4.01 |
| 2012/0051631 | A1 | 3/2012 | Nguyen et al. |
| 2012/0059720 | A1 | 3/2012 | Musabji et al. |
| 2012/0114225 | A1 | 5/2012 | Lim et al. |
| 2012/0133639 | A1* | 5/2012 | Kopf et al. ............ 345/419 |
| 2012/0223937 | A1 | 9/2012 | Bendall |
| 2013/0030699 | A1 | 1/2013 | Barnes et al. |
| 2013/0038689 | A1 | 2/2013 | McDowall |
| 2013/0155180 | A1* | 6/2013 | Wantland ............ G06T 13/80 348/36 |
| 2013/0202197 | A1 | 8/2013 | Reeler et al. |
| 2013/0308013 | A1 | 11/2013 | Li et al. |
| 2015/0062305 | A1 | 3/2015 | Murayama et al. |

FOREIGN PATENT DOCUMENTS

| | | | |
|---|---|---|---|
| WO | WO2009131276 | A1 | 10/2009 |
| WO | WO 2010/012310 | | 2/2010 |
| WO | WO 2010024212 | A1 * | 3/2010 |

OTHER PUBLICATIONS

David Gallup et al., "Piecewise Planar and Non-planar Stereo for Urban Scene Reconstruction", Jun. 13, 2010, pp. 1418-1425, 2010 IEEE Conference on Computer Vision and Pattern Recognition.

International Search Report and Written Opinion, from related International Application No. PCT/EP2012/070438, Apr. 17, 2013.

International Search Report and Written Opinion, from related International Application No. PCT/EP2012/075022, Apr. 15, 2013.

Stephen Shankland, "Google Gathers 3D Data with Street View", May 15, 2008, retreived from the internet: URL: http://news.cnet.com/8301-10784_-9945.

International Search Report and Written Opinion cited in PCT/EP2012/069812 mailed on Mar. 6, 2013.

Kawakita et al., "Real-Time Three-Dimensional Video Image Composition by Depth Information", IEICE Electronics Press, vol. 1, No. 9, Aug. 10, 2004.

U.S. Appl. No. 13/278,499, filed Oct. 21, 2011, Lynch, unpublished.

U.S. Appl. No. 13/278,512, filed Oct. 21, 2011, Lynch, unpublished.

U.S. Appl. No. 13/278,546, filed Oct. 21, 2011, Lynch, unpublished.

"Google Maps Navigation for Mobile." http//www.google.com/mobile/navigation/. 2 pages (viewed on Oct. 19, 2011).

International Search Report and Written Opinion from PCT/EP2012/074881, Apr. 8, 2013.

U.S. Appl. No. 13/332,718, filed Dec. 21, 2011, Lynch, unpublished.

U.S. Appl. No. 13/341,152, filed Dec. 30, 2011, Lynch, unpublished.

Ding, Ming, et al., "Automatic registration of aerial imagery with untextured 3D LiDAR models," University of California Berkeley, 8 pages.

Inpainting, http://iat.ubalt.edu/summers/math/inpainting.htm (viewed on Nov. 30, 2011).

Kopf, Johannes, et al., "Street Slide: Browsing Street Level Imagery," Microsoft Research, 8 pages.

Anderson et al., Unwrapping and Visualizing Cuneiform Tablets, 2002, p. 82-88, vol. 22, Issue 6, IEEE Computer Graphics and Applications.

Hu et al., Integrating LiDAR, Aerial Image and Ground Images for Complete Urban Building Modeling, 2006, p. 184-191, 3D Data Processing, Visualization and Transmission.

Song et al., Assessing the Possibility of Land-Cover Classification using LiDAR Intensity Data, 2002, p. 259-262, International Archives of Photogrammetry.

Wei, Building Boundary Extraction Based on LiDAR Point Clouds Data, 2008, pp. 157-162, 37, Part B3b, International Archives of Phtotgrammetry Remote Sensing and Spatial Information Sciences.

Yu et al., Automated Derivation of Urban Building Density Information using Airborne LiDAR Data and Object-Based Method, 2010, p. 210-219, Elsevier, Landscape and Urban Planning 98.

Frueh et al., Data Processing Algorithms for Generating Textured 3D Building Facade Meshes from Laser Scans and Camera Images, 2005, p. 159-184, vol. 61, International Journal of Computer Vision.

Communication pursuant to Article 94(3) EPC in EP12798315.3, mailed Nov. 20, 2015.

Communication Pursuant to Article 94(3) EPC in EP12805510.0, mailed Nov. 11, 2015.

* cited by examiner

PATH SIDE IMAGERY

REFERENCE TO RELATED APPLICATIONS

The present patent application is related to the copending patent application filed on the same date, Ser. No. 13/341,152, entitled "PATH SIDE IMAGE ON MAP OVERLAY;", the entire disclosure of which is incorporated by reference herein.

BACKGROUND OF THE INVENTION

The present invention relates to navigation and, more particularly, to method(s) and system(s) for generating orthographic path side imagery.

Conventional street view involves the manipulation of image bubbles. Image bubbles are panoramic images collected with respect to a single perspective. The image bubbles may extend nearly 360 degrees along one or more axes. Zooming and panning within an image bubble provides a view from a particular viewpoint but cannot provide a realistic view along an entire city block or a longer section of the street. To view another perspective, a typical street level viewing application must be switched to the next image bubble. That is, in order to view the scene along the side of the street, a user must select a direction to move to the next image bubble and wait for the next image bubble to load, which may also require a panning operation.

SUMMARY OF THE INVENTION

One or more systems, devices, and/or methods for generating path side imagery are disclosed. For example, a method includes receiving optical data measured in three-dimensional geographic coordinates and image data from at least one image bubble. The optical data is projected onto at least one predefined two-dimensional plane. A pixel value for a point of the optical data on the two-dimensional plane is calculated according to the image data. The pixel value may correspond to color or another graphical attribute. The two-dimensional plane is stored or displayed as street side imagery or other path side imagery. An image file including the pixel value for each point of the optical data may be stored in memory or a map database.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1A:
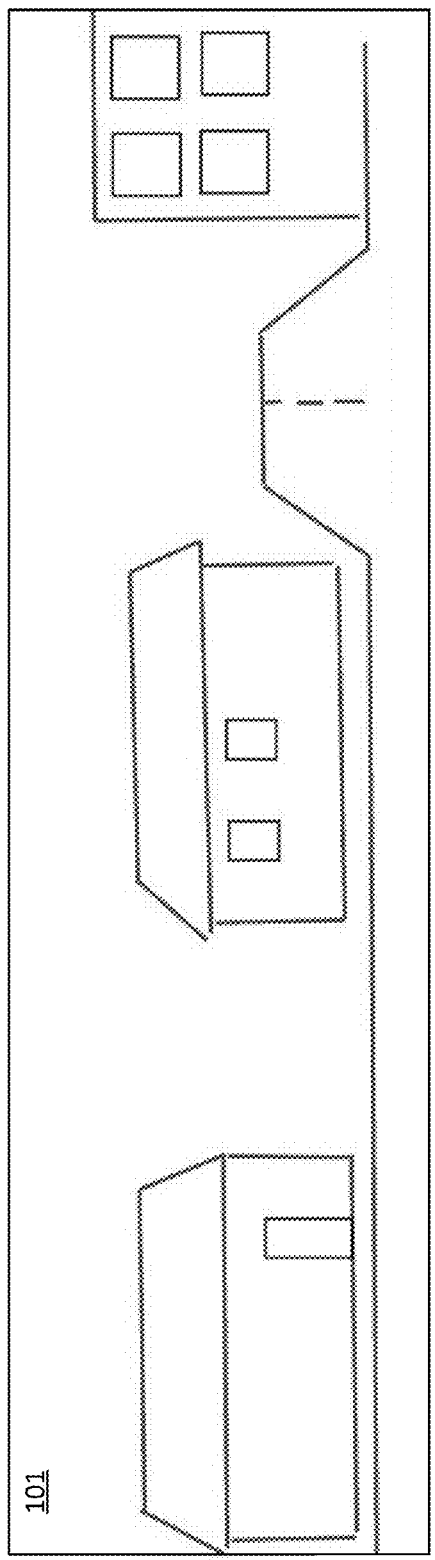
FIGS. 1A and 1B illustrate stitching of panoramic images.
Figure 1B:
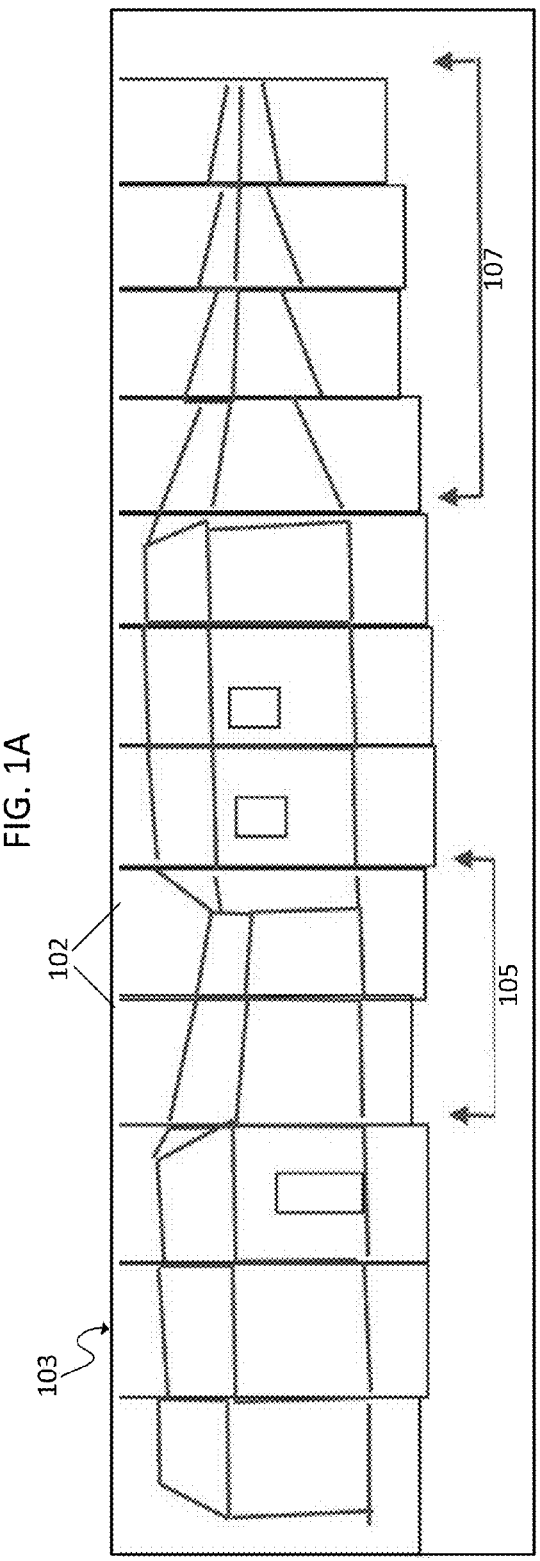

FIGS. 1A and 1B illustrate stitching of panoramic images or image bubbles. FIG. 1 illustrates an example street side view 101 along a street as would be viewed from the perspective of a viewer present on the street. FIG. 1B is an approximation street side image 103 generated from a plurality of image bubbles. The approximation street side image 103 is formed by stitching together several image strips 102 taken from successive image bubbles. Each of the image strips 102 was collected at a different perspective. The perspectives may be equally spaced along the street and/or dependent on the process for collecting the image bubbles.

The image strips 102 may have equal widths. In this example, a uniform slice is taken from each image bubble and stitched together. Alternatively, the image strips 102 are analyzed to identify an approximate seam from one image to the next. However, objects in the image strips 102 are at different distances from the street. Therefore, in many cases, there is no perfect seam between adjacent image strips 102. Open spaces between buildings are particularly problematic, as shown by regions 105 and 107 in FIG. 1B.

Figure 2:
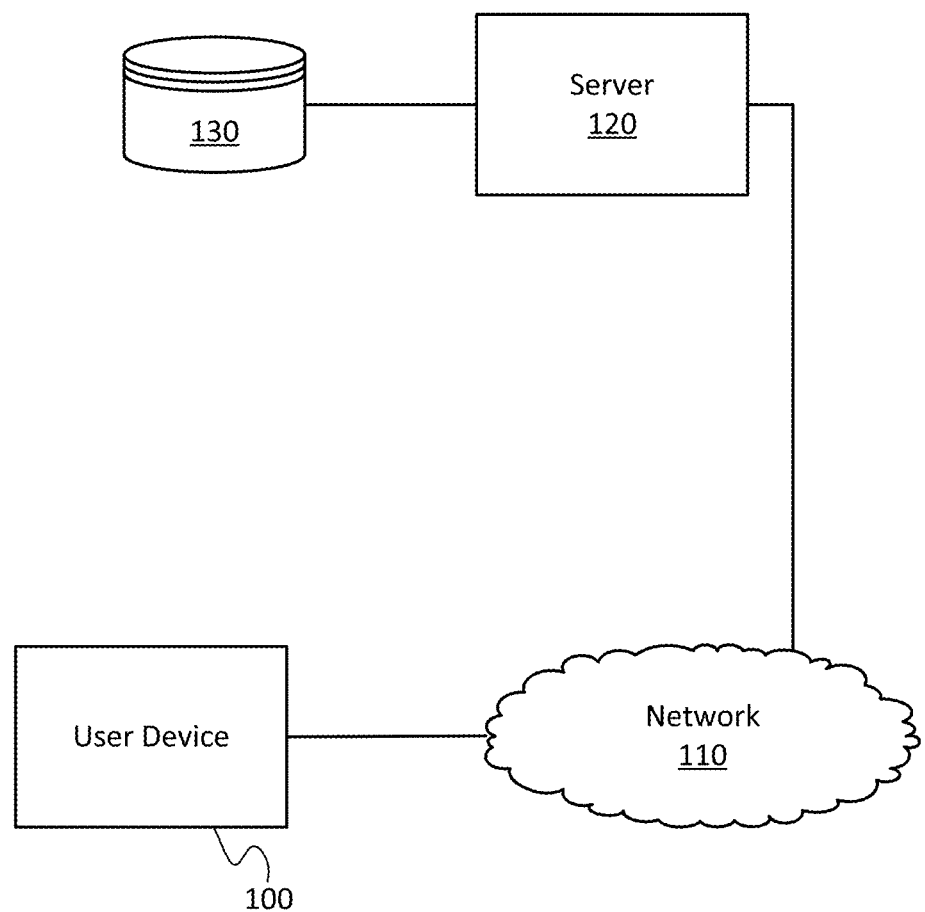
FIG. 2 illustrates a system for generating street side imagery.

FIG. 2 illustrates a system 150 for generating street side imagery. The system 150 includes a user device 100, a network 110, a server 120, and a geographic and/or map database 130. The geographic database 130 may be maintained by a map developer, such as NAVTEQ North America, LLC located in Chicago, Ill. The map developer may collect geographic data to generate and enhance the geographic database 130. The user device 100 may be a cellular telephone (smart phone), a personal digital assistant ("PDA"), a tablet computer, a laptop, a personal navigation device ("PND"), a personal computer or another computing device.

The system 150 receives optical data measured in three-dimensional geographic coordinates. The optical data may be a depthmap generated from an optical distancing system. The optical distancing system may be a light detection and ranging (LIDAR) device, a stereoscopic camera, or a structured light device. The optical data may be created using any arbitrary viewpoint or perspective. The optical data may be generated for each panoramic image viewpoint and stored in the database 130. The optical data may include geo-coordinates such as latitude, longitude, and altitude for each of plurality of points.

The system 150 projects the optical data onto at least one predefined two-dimensional plane. The predefined two-dimensional plane may be parallel to the street and/or the direction of movement of the optical distancing system as the optical data is collected. The predefined two-dimensional plane may be selected to estimate a building facade along the street.

The system 150 receives image data from at least one panoramic image or image bubble. The at least one image bubble may be collected by a camera. The image bubble may have a center point measured in Cartesian coordinates such as an X-coordinate, a Y-coordinate, and a Z-coordinate. Each point on the image bubble is defined by the center point and one or more angles (e.g., roll, pitch, yaw). By correlating the Cartesian space of the image bubble and the geo-referenced three-dimensional space of the optical data, the system 150 associates one or more points of the optical data with one or more pixels in the image bubble.

The predefined two-dimensional plane is modified to illustrate street side imagery. Specifically, the pixel values of the image bubble are applied to the optical data projected onto the predefined two-dimensional plane. In other words, the system 150 calculates a pixel value for each point of the optical data on the at least one predefined two-dimensional plane. For example, the system 150 may colorize the optical data in the two-dimensional plane to resemble the street side imagery simulating the captured image of the image bubble.

The system 150 stores at least one image file including the pixel value for each point of the optical data. The system 150 may assign the image file to a navigation link, which may also be referred to as a segment, or another object in the database 130. The navigation link is associated with the center point of the image bubble. The navigation link may correspond to a street, a road, a pathway, a pedestrian walkway, a train path, a waterway, or any other navigable pathway. Alternatively or in addition, the system 150 may store the image file including points projected from the optical data and having pixel values defined by the image bubble in the database 130. The pixel values may include one or more of a color, a hue, a brightness, a luminance, and an intensity of the pixel.

The system 150 may project the optical data onto a plurality of predefined two-dimensional planes. The plurality of predefined two-dimensional planes may be defined by a distance range. For example, optical data from the center point to the curb of the street may be snapped to a first plane, optical data from the curb to just before the building facade may be snapped to a second plane, and optical data from the building facade and optical data farther from the center point may be snapped to a third plane. The system 150 may store an image file for each plane in the database 130. Each image file includes pixel values defined by the image bubble.

Figure 3:
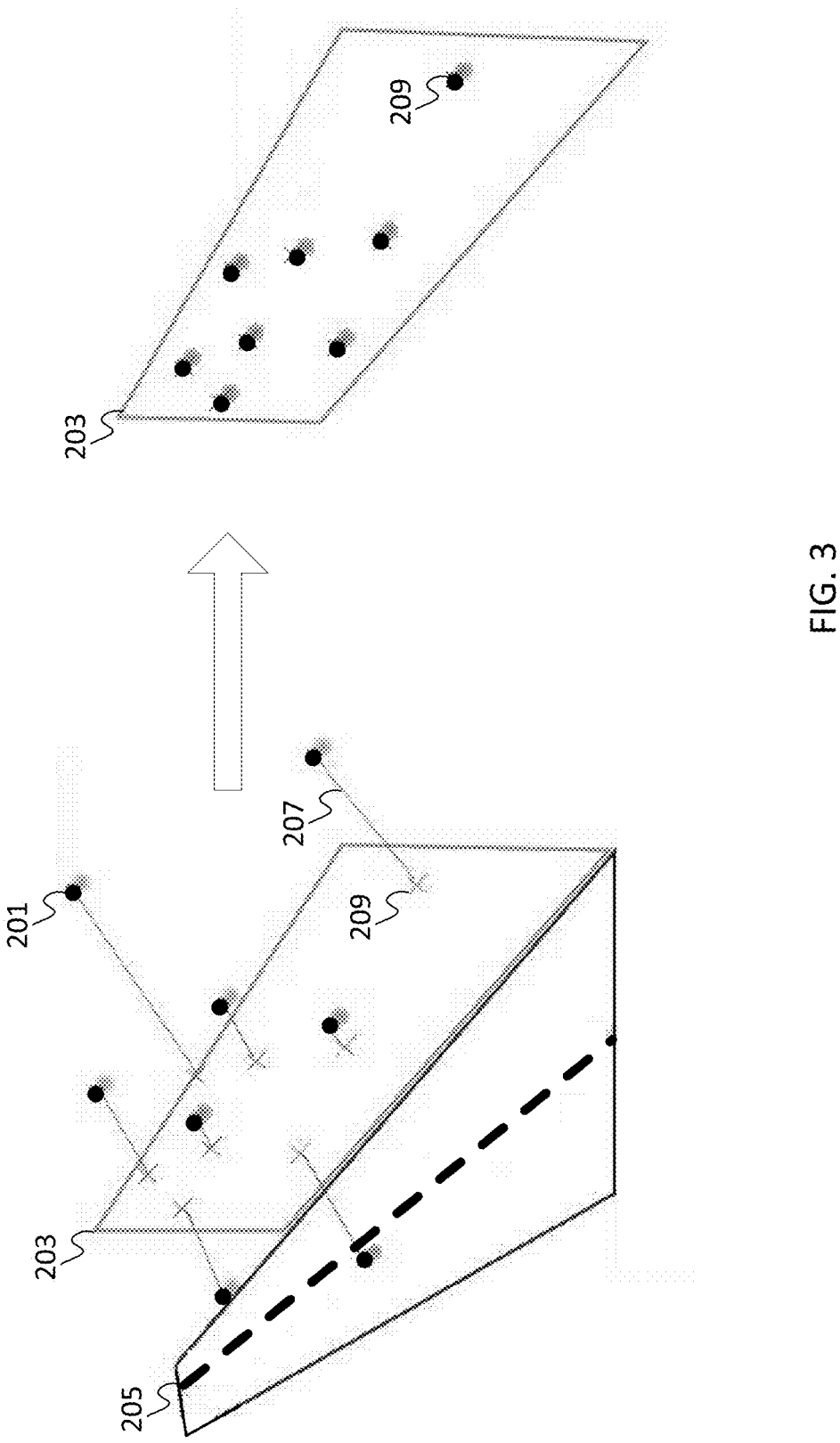
FIG. 3 illustrates the projection of the optical data on a two-dimensional plane.

FIG. 3 illustrates the projection of optical data 201 on a two-dimensional plane 203. The optical data 201 may be generated by an optical distancing system that employs one or more lasers to collect data points representing an area, such as an area about a road 205, walkway, or other pathway. Software generates the optical data based on the measured distance, the location of the optical distancing system, which may be on a moving platform such as a car (or Segway, animal, pedestrian, or other vehicle or object), and the angle of the laser. Optical distancing systems include LIDAR, a stereoscopic camera, a time of flight infrared camera, and a structured light device.

A LIDAR device collects and gathers data points in a point cloud in which each data point corresponds to a local coordinate, such as (x, y, z), and is either on or off. Alternatively, the LIDAR data may be a grayscale point cloud including an intensity for each data point, ranging from 0 for black to 255 for white or vice versa. The point cloud may be stored in ASCII or LIDAR exchange format. The one or more lasers may be in a near infrared spectrum (such as about 700 nm to about 5000 nm or about 800 nm to about 2500 nm) or other light spectrum.

The view on the left side of FIG. 3 illustrates the optical data in the geographically referenced three-dimensional space. The orthogonal lines 207 show the projection of the optical data onto the two-dimensional plane 203. The projection may be an orthographic projection or any other type of projection for representing three-dimensional points in two dimensions. The orthographic projection is defined as any parallel projection, including projection lines (e.g., orthogonal lines 207) perpendicular to the projection plane (e.g., two-dimensional plane 203), which preserves a relationship between the original points. The orthographic projection may include exactly one translation and one linear transformation for each point. The view on the right side of FIG. 3 illustrates the two-dimensional plane 203 including the projected optical data 209.

Figure 4:
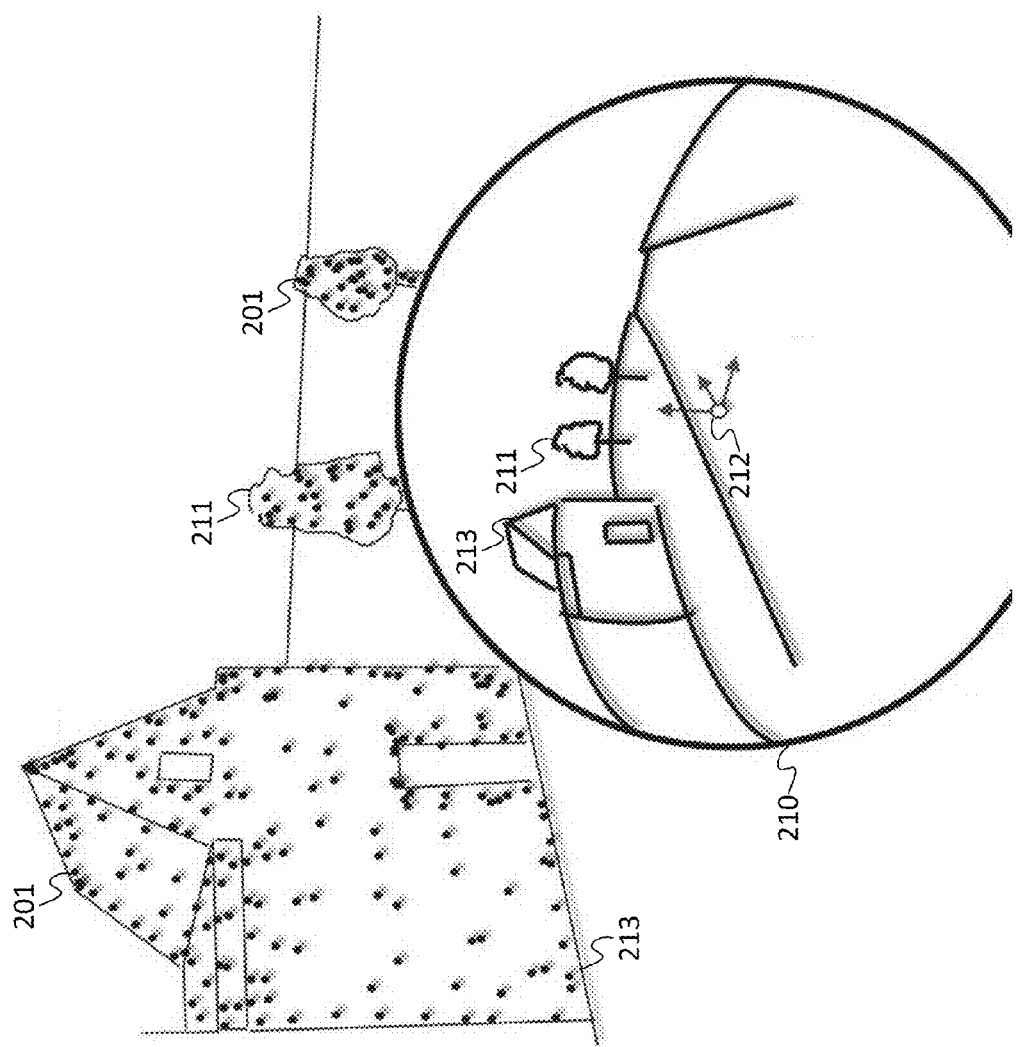
FIG. 4 illustrates a view correlating the optical data to an image bubble.

FIG. 4 illustrates a view correlating the optical data 201 to an image bubble 210. The geo-referenced three-dimensional space of the optical data 201 is shown on a real world scene including a building 213 and trees 211. The optical data 201 is aligned with the Cartesian space of the image bubble 210 as shown by Cartesian axes 212. The alignment may be calculated using an orientation quaternion. An orientation quaternion may be defined as a four element mathematical notation for describing a rotation. The orientation quaternion may describe the rotation from the geo-referenced three-dimensional space to the Cartesian space or vice versa.

Figure 5:
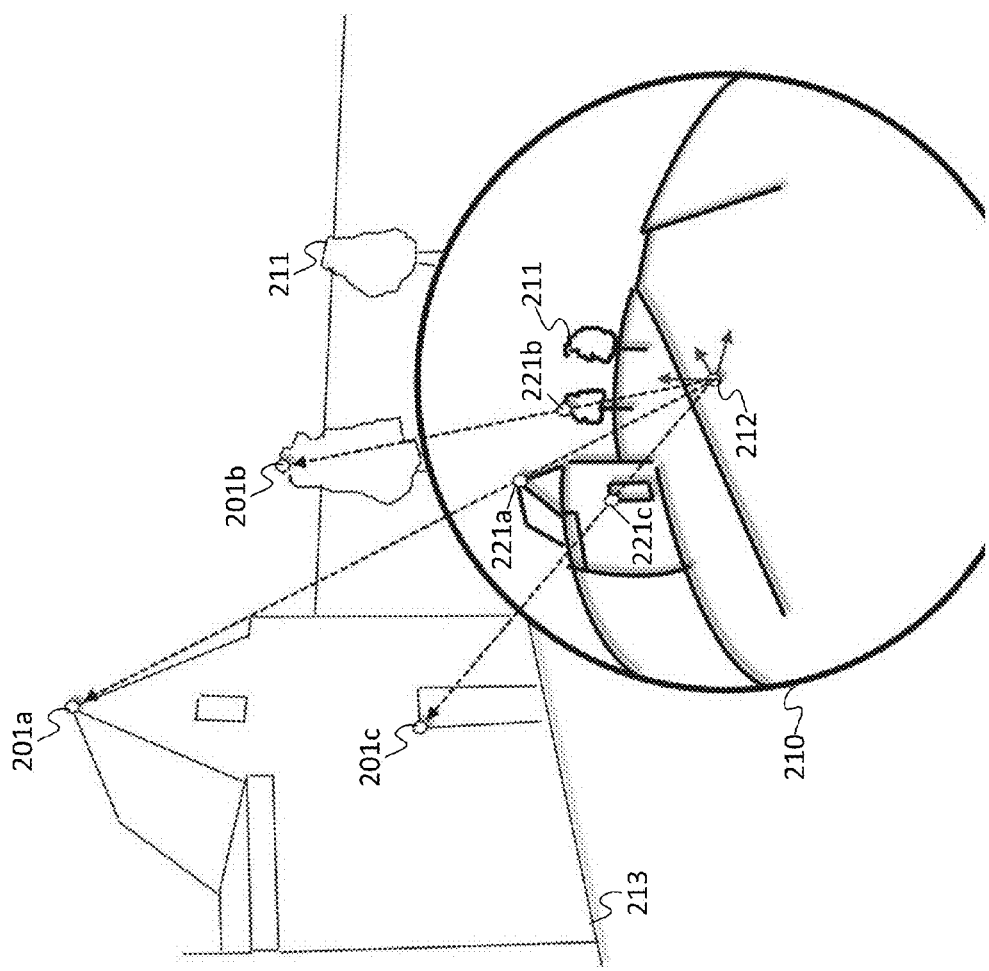
FIG. 5 illustrates another view correlating the optical data to the image bubble.

FIG. 5 illustrates another view correlating the optical data 201 to the image bubble 210. Individual portions of the optical data 201 correspond to pixels of the image bubble 210. For example, a first pixel 221a in the image bubble 210 near the top of building 213 corresponds to a first optical datum 201a, a second pixel 221b in the image bubble 210 on the tree 211 corresponds to a second optical datum 201b, and a third pixel 221c in the image bubble 210 near the door of building 213 corresponds to a third optical datum 201c.

One or more pixel values from the image bubble 210 are applied to one or more data points in the optical data 201. In some implementations, there is a one to one ratio in the application of pixel values from the image bubble 210. For example, a pixel value from the first pixel 221a is stored in the two-dimensional plane 203 in association with the first optical datum 201a, a pixel value from the second pixel 221b is stored in the two-dimensional plane 203 in association with the second optical datum 201b, and a pixel value from the third pixel 221c is stored in the two-dimensional plane 203 in association with the third optical datum 201c. In other implementations, a group of pixels in the image bubble 210 may be applied to one data point in the optical data 201. The pixel values of the group of pixels may be averaged to select the new value of the data point in the optical data 201. Alternatively, the median pixel value of the group of pixels may be used or the pixel values may be weighted according to the location (e.g., the weight of each pixel may be inversely proportion to the distance from the center of the group of pixels).

In other implementation, a group of pixels in the image bubble 210 may be applied to an area surrounding a data point in the optical data 201. The group of pixels in the image bubble 210 may be referred to as an image splat. In other words, a larger section of image data is cut from image bubble 210 and applied to the two-dimensional plane. The size of the section of image data may be measured in pixels. The size of the section of image data may be a function of the location of the data point in the optical data 201. Data points farther from the perspective of the user may be associated with a smaller number of pixels from the image bubble 210 and data points closer to the perspective of the user may be associated with a larger number of pixels from the image bubble 210. In another example, size of the section of image data may be a function of the length of orthogonal line 207 associated with the particular data point in the optical data.

In another example, a single pixel value from the image bubble 210 may be applied to multiple data points in the optical data 201. Across the predefined two-dimensional plane any combination of these algorithms may be used. The selection of the algorithm may be dependent on the density of the optical data 201, which may vary significantly, as shown by FIG. 4. Interpolation may be used to obtain a continuous set of optical data 201.

In another implementation, the color may be generated entirely based on the depth information without using the image pixels. For example, the color may be based on depth change to indicate edge outlines. This method is used to generate a gray scale silhouette or line based street side view scene. In another mode, the edge color may be mixed with the image pixels to create an image based street side scene with enhanced edges.

The pixel values may specify color. The pixel values may include a red value, a green value, and a blue value, referred to collectively as a RGB value. Alternatively, the pixel values may be grayscale. The resulting "image" in the two-dimensional plane 203 is a collection of colorized optical data. In addition or in the alternative, the pixel values may specify a hue, a brightness, a luminance, and/or an intensity of the pixel. Hue may be defined as the degree to which a stimulus can be described as similar to or different from the unique hues (red, blue, green, yellow). Brightness may be defined as the degree to which the pixel appears to be radiating or reflecting light. Likewise, luminance may be defined as a measurement of the luminous intensity per unit area of light (e.g., candela per square meter). Intensity may be defined as lightness, amplitude, color value, color tone, or any description that relates to the subjective perception of human being on the lightness-darkness axis as described by a color model. Any of the above quantities may be described by the Lab color model, the hue, saturation, lightness (HSL) color model, or the hue, saturation, and value (HSV) color model.

Figure 6:
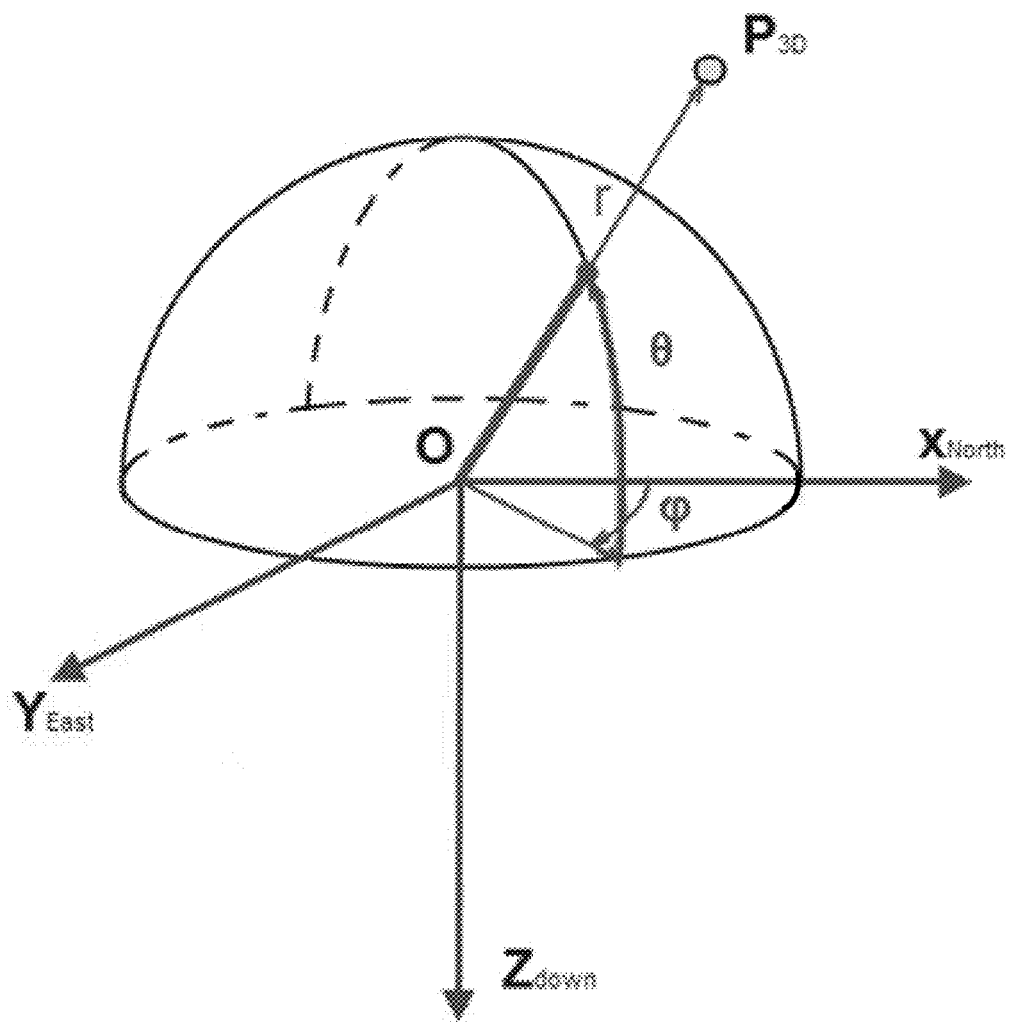
FIG. 6 illustrates mapping the optical data to an image bubble.

FIG. 6 illustrates an example algorithm for mapping the optical data 201 to an image bubble 210. The process may inversely involve the mapping of spherical coordinates of the image bubble 210 to the geographical coordinate space of the optical data 201. Through geometry, an example point ($P_{3D}$) in the optical data 201 may be referenced as a vector extending from the center point (O) of the image bubble 210 having radius (r). The vector includes an X-coordinate ($V_x$), a Y-coordinate ($V_y$), and a Z-coordinate ($V_z$). The vector, or a line extending in the direction of the vector, intersects the image bubble 210. The pixel values at or near the intersection of the vector and the image bubble 210 are stored as the two-dimensional plane 203. Equations 1 and 2 provide an example calculation for mapping the example point $P_{3D}$ to the spherical coordinates ($\theta$, $\phi$) from which the pixel value is determined. The spherical coordinates may be converted to image pixel coordinates based on the image dimensions (i.e., the number of pixels in the image).

$$\phi = \arctan(-Vy/Vx) \quad \text{Eq. 1}$$

$$\theta = \arcsin(-Vz) \quad \text{Eq. 2}$$

Figure 7:
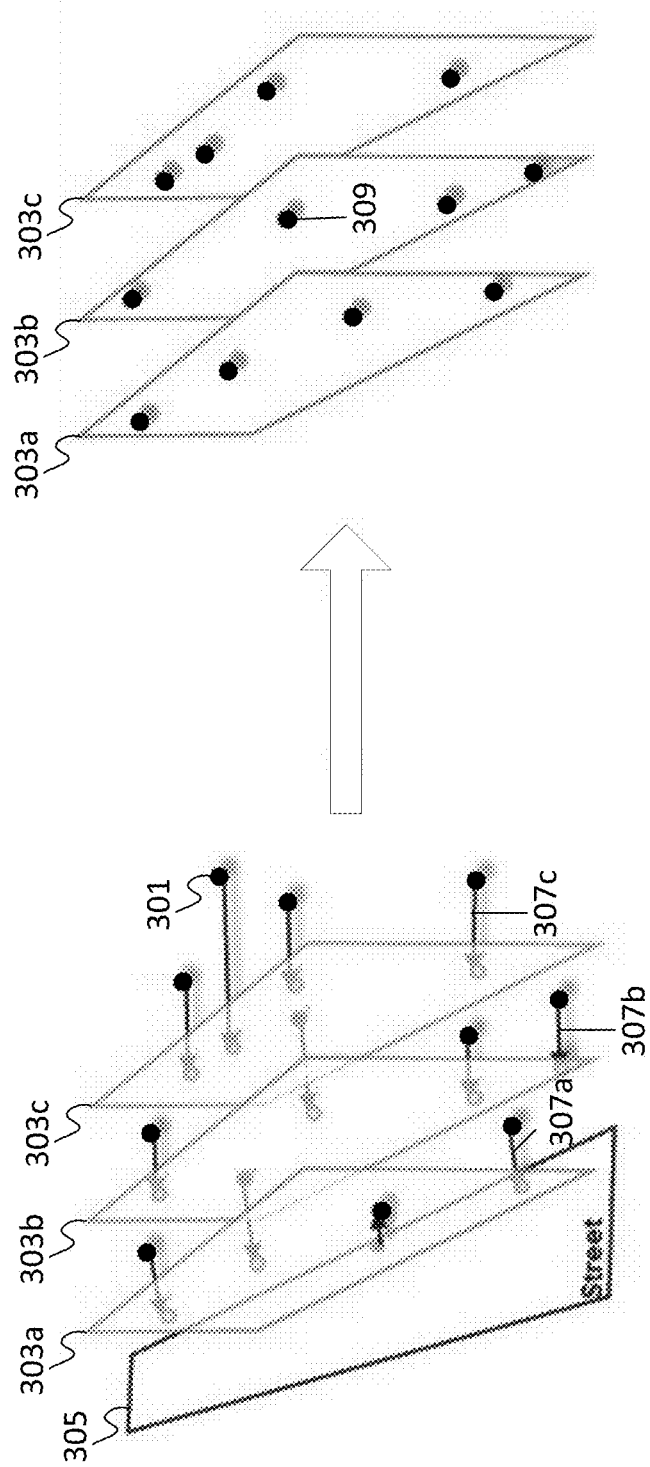
FIG. 7 illustrates the projection of the optical data on a plurality of two-dimensional planes.

FIG. 7 illustrates the projection of the optical data 301 on a plurality of two-dimensional planes 303a-c. The view on the left side of FIG. 7 illustrates the optical data 301 in the geographically referenced three-dimensional space. The plurality of two-dimensional planes 303a-c may be defined in a variety of algorithms such as a distance algorithm, a statistical algorithm, an image processing algorithm, or a database algorithm. The orthogonal lines 307a-c show the projection of the optical data onto the two-dimensional planes 303a-c. The view on the right side of FIG. 7 illustrates the two-dimensional planes 303a-c including the projected optical data 309.

In the distance algorithm, the plurality of two-dimensional planes 303a-c are defined based on distance. Any number of planes may be used. The distance may be measured from the collection point of the optical data 201 and/or the collection point of the image bubble 210. The distance may be measured from another reference point. The first plane 303a may be associated with a first threshold distance (e.g., 1 m, 5 m, 10 m). Points within the first threshold distance are projected onto the first plane 303a. The second plane 303b may be associated with a second threshold distance (e.g., 2 m, 5 m, 10 m). Points farther from the center point than the first threshold distance but within the second threshold distance are projected onto the second plane 303b. The third plane 303c may be associated with a third threshold distance (e.g., 5 m, 10 m, 20 m). Points farther from the center point than the third threshold distance are projected on the third plane 303c. The projection of the optical data 201 to the two-dimensional planes 303a-c may be according to the processes discussed above with respect to FIG. 3.

The statistical algorithm may define the plurality of two-dimensional planes 303a-c according to the values of the optical data 201. For example, the optical data 201 may be divided into N groups of data. For example, if N=2, the optical data 201 is divided in half according to distance. A first half of the optical data 201 is projected onto a first plane, and a second half of the optical data 201 is projected onto a second plane. N may be any integer value and an amount of data equal to 100/N percent of the total optical data 201 is projected on each plane. Alternatively, the optical data 201 could be divided according to standard deviation, variance, or the rate of change of distance.

The image processing algorithm may define the plurality of two-dimensional planes 303a-c according to trends in the optical data 201. The trends may identify navigation features in the optical data. The navigation features may include one or more of a road surface, a curb, a sign, a parked car, or a building facade. For example, the optical data 201 may be analyzed to determine the location of a curb, a building facade, or another object in the data. The image processing algorithm divides the optical data 201 such that points from the road surface to the curb are snapped to the first plane 303a, points from the curb to just before the buildings are snapped to the second plane 303b, and points from the building facade and beyond are snapped to the third plane 303c.

The database algorithm may define the plurality of two-dimensional planes 303a-c according to a database of physical features, which may be included in the map database or geographic database 130. The physical features may be building footprints, the number of lanes or dimensions of the pathway, or any known reference points that define the location of the building facade.

Figure 8:
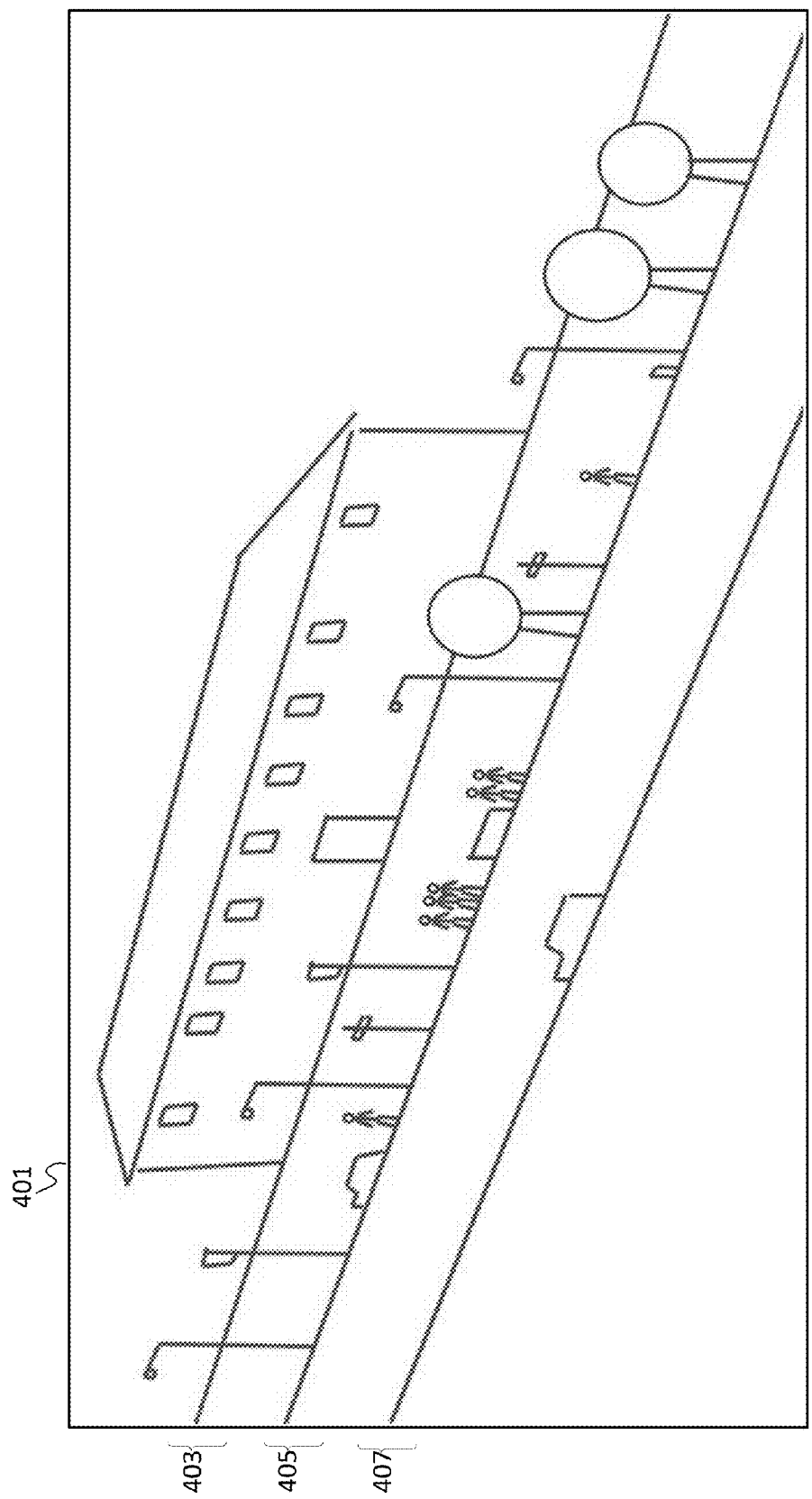
FIG. 8 illustrates street side imagery using the plurality of two-dimensional planes of FIG. 7.

FIG. 8 illustrates the street side imagery 401 using the plurality of two-dimensional planes 303a-c of FIG. 7. The street side imagery 401 is divided into a layer for each of the two-dimensional planes 303a-c. The first layer 407 includes points with pixel values selected from one or more image bubbles according to the optical data projected onto the first plane 303a. For example, the first layer 407 includes objects closest to the perspective of the street side imagery 401 such as the road surface and vehicles in the road or parked cars. The second layer 405 includes points with pixel values selected from one or more image bubbles according to the optical data projected onto the second plane 303b. For example, the second layer 405 includes objects from the curb to the building facade such as pedestrians, street signs, light poles, trees, and shrubbery. The third layer 403 includes points with pixel values selected from one or more image bubbles according to the optical data projected onto the third plane 303c.

A hole filling algorithm and/or smoothing algorithm may be applied to resulting image planes to handle regions where the depth information density is insufficient or where image information is obstructed in all image views. The hole filling algorithm may interpolate pixel values for a selected pixel based on surrounding pixel values. The smoothing algorithm may variably adjust pixel values based on surrounding pixel values.

All of the points in the street side imagery 401 are snapped, projected, or compressed into the discrete first layer 407, second layer 405, and third layer 403. Each layer has the same length dimension in the street side imagery 401 but corresponds to different geographical distances in the image bubbles and, accordingly, in the real world. Therefore, as the street side imagery 401 is scrolled to view the entire street, the layers may scroll at different rates. The different rates may be proportional to the ratio of the first threshold distance and the second threshold distance.

Figure 9:
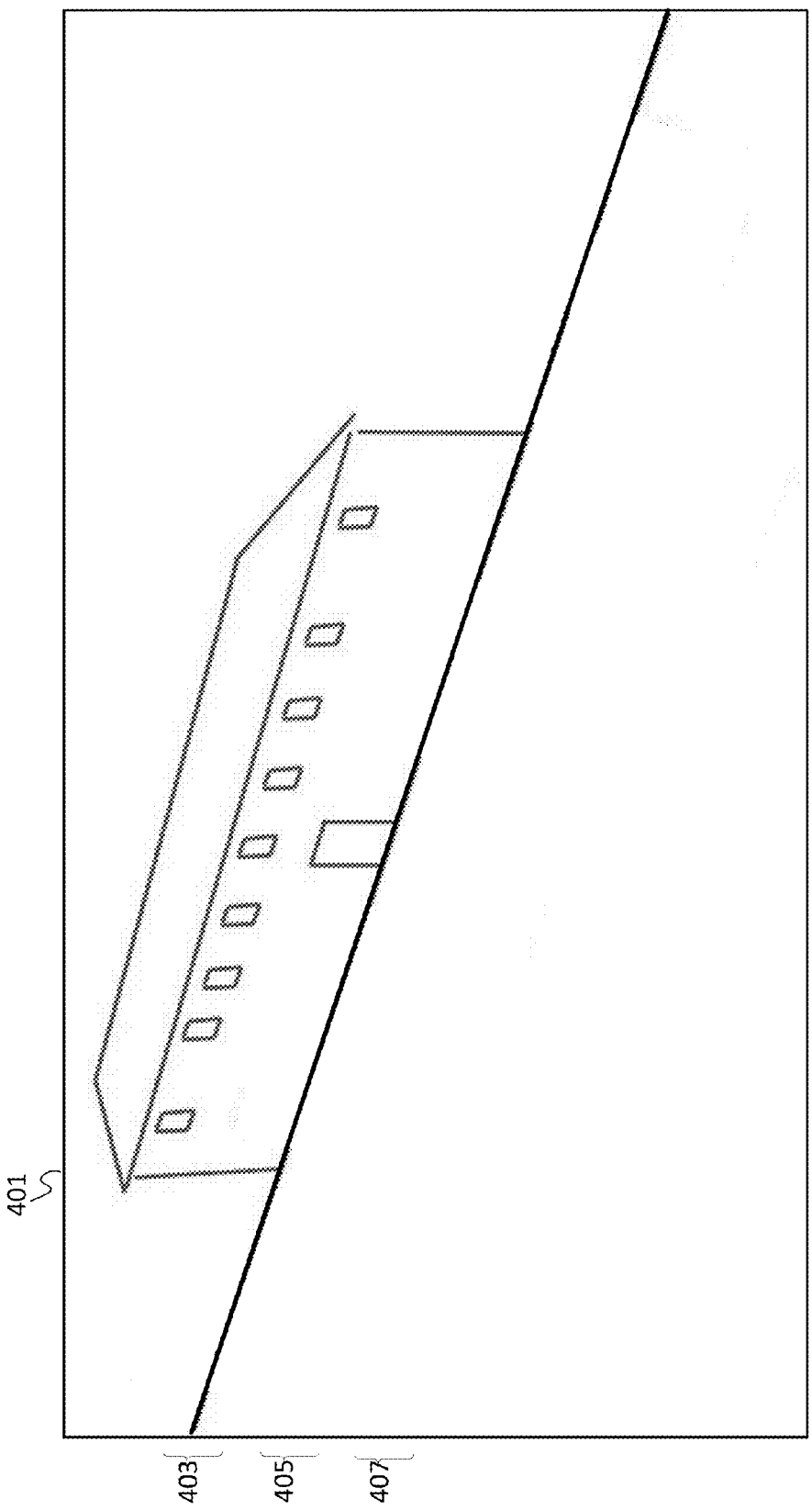
FIG. 9 illustrates an example of the street side imagery of FIG. 8.

FIG. 9 illustrates an example of the street side imagery 401 of FIG. 8. The street side imagery 401 may be toggled to selectively display any combination of the discrete first layer 407, second layer 405, and third layer 403. Alternatively, the street side imagery 401 may be toggled to lighten the color intensity of any combination of the discrete first layer 407, second layer 405, and third layer 403. The street side imagery 401 may be toggled by the user of the map application or user device 100 or the developer of the map application at the server 120 and/or stored in database 130. Therefore, only the most relevant layer of the street side image 401, such as the building facade, may be displayed, and other portions of the street side image 401, such as parked cars and pedestrians are removed from the street side image 401. The street side imagery 401 may be toggled by setting a distance range to be displayed or by selecting image files to be displayed.

Figure 10:
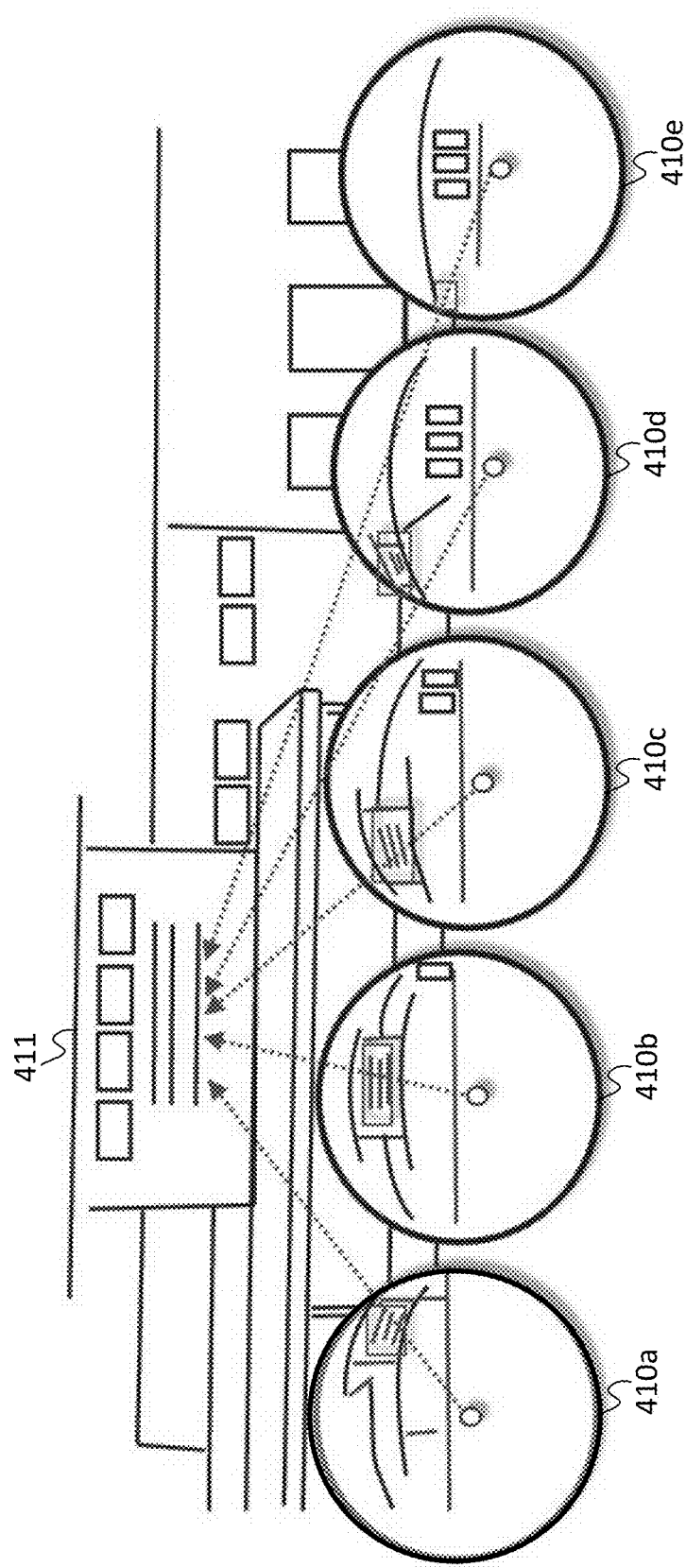
FIG. 10 illustrates a plurality of image bubbles correlated with a street side view.

FIG. 10 illustrates a plurality of image bubbles 410a-e correlated with a street side view. Because of the panoramic nature of the image bubbles 410a-e, successive image bubbles overlap. That is, a single point in the real world, and accordingly in optical data 201, occurs in multiple image bubbles 410a-e. This principle is shown by building 411 in FIG. 10. Each of image bubbles 410a-e may provide a different perspective of building 411. Any of the algorithms for selecting the pixel values for the predefined two-dimensional plane, as described above, may be modified to include pixel values from a plurality of image bubbles. The pixel values from the plurality of image bubbles may be averaged. In other examples, pixel values from certain image bubbles may be ignored.

Figure 11:
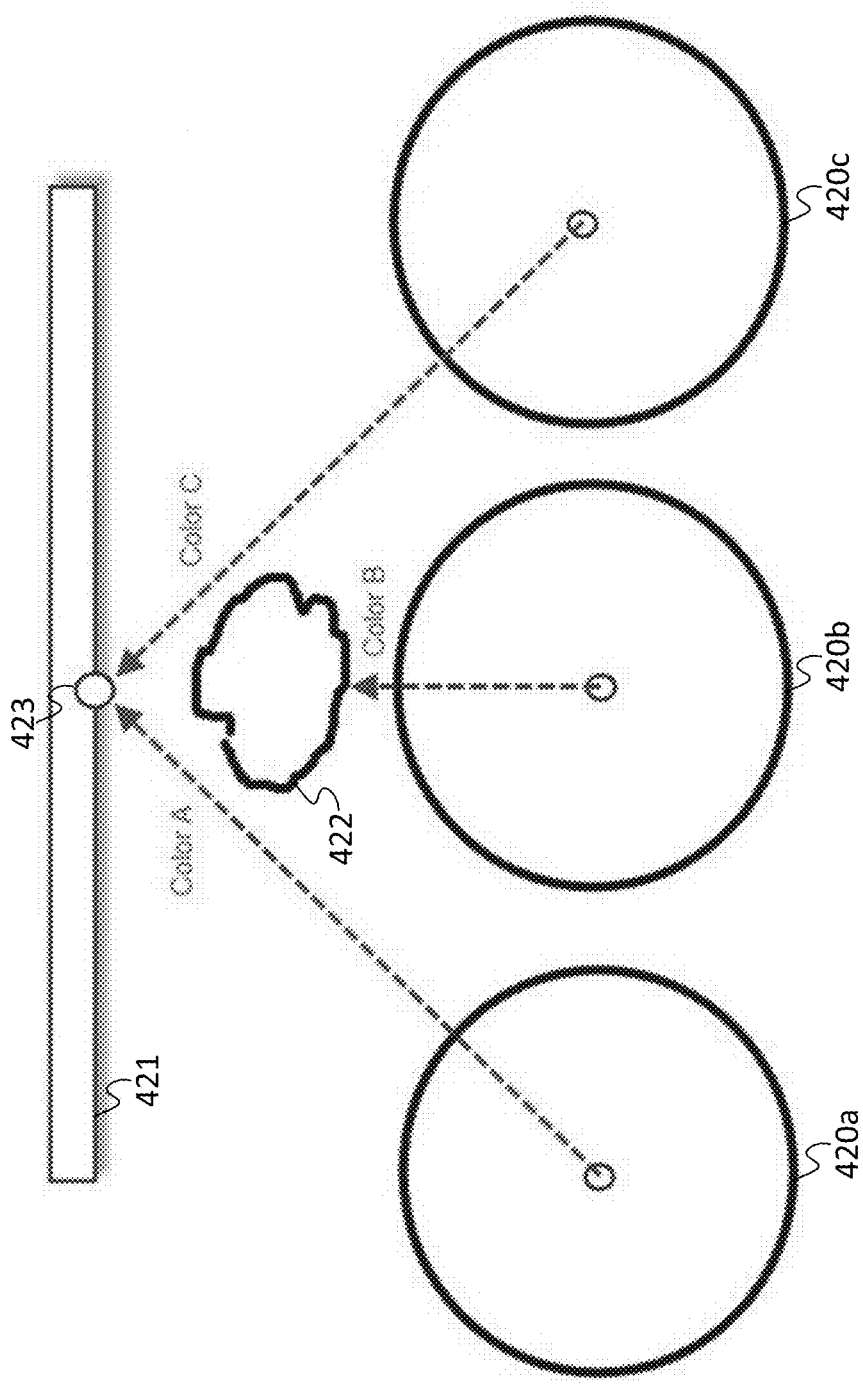
FIG. 11 illustrates an example obstruction using a plurality of image bubbles.

FIG. 11 illustrates an example obstruction 422 and multiple image bubbles 420a-c. The image bubbles 420a-c may include any number of image bubbles such as three, five, or ten image bubbles spaced at distance intervals (e.g., 1 m, 5 m, 10 m) or at time intervals of a moving camera. For a particular point 423 on the object 421, the associated pixel value in image bubble 420a is Color A, the associated pixel value in image bubble 420b is Color B, and the associated pixel value in image bubble 420c is Color C. Color A and Color C appropriately correspond to different perspectives of the particular point 423. However, Color B corresponds to obstruction 422 between the image bubble 420b and the object 421. If Color B was averaged or otherwise considered in the selection for the data point of the two-dimensional plane, the obstruction 422 would adversely affect the appearance of the street side image 401. Therefore, Color B may be ignored and Color A and Color C may be averaged. The system 150 may identify that Color B was caused by an obstruction, or otherwise erroneous, because Color B is an outlier. An outlier may be defined as a pixel value far away from the other pixel values from other image bubbles corresponding to the same point in the optical data 201. For example, any pixel value that is a predetermined number (e.g., 1, 2, 3) of standard deviations away from the mean pixel value may be considered an outlier. Alternatively, any pixel value that differs from the mean pixel value by minimum variation may be considered an outlier. For example, the minimum variation may be 50 or 100 on a 0 to 255 scale for pixel values. Example outliers 422 may be caused by light poles, moving cars, pedestrians, trees, leaves, or any object that may be between the building facade and the camera at some perspectives and not at others.

The computing resources necessary for generating street side imagery may be divided between the server 120 and the user device 100. In some embodiments, the server 120 performs a majority of the processing ("server-based embodiments"). In other embodiments, the user device 100 performs a majority of the processing ("user device-based embodiments").

For navigation related applications, the user device 100 may generate a location according to the geographic location of the user device 100. The location may be generated using positioning circuitry including one or more of a global navigation satellite system based on a satellite signal, a triangulation system that utilizes one or more terrestrial communication signals, a inertial position system based on sensors such as gyroscopes or accelerometers, and/or a dead reckoning system based on a previously known position. The positioning circuitry may also determine an orientation using any of the above systems and/or a magnetic sensor such as a compass. The orientation and the location allow the appropriate depthmap and panoramic image to be selected based on the perspective of the user at the current geographic location of the user device 100.

The network 110 may include any combination of a cellular network, the Internet, or a local computer network. For example, the user device 100 may communicate with the network 110 wirelessly though protocols known as Wi-Fi, the protocols defined by the IEEE 802.11 standards, the protocols defined by the Bluetooth standards, or other protocols. Alternatively or in addition, the user device 100 may communicate with the network 110 wirelessly as a cellular network such as a Global System for Mobile Communication (GSM) or other third generation (3G) or fourth generation (4G) networks.

The optical distancing system may be a LIDAR device, a stereoscopic camera, a time of flight camera, a structured light device, or another device. In the example of a LIDAR device, one or more (e.g., 1, 2, 10) lasers rotate in a plane. The optical distancing system may be coupled with an inertial measurement unit (IMU) to associate the optical distance data with the geo-located position of the optical distancing system.

The optical distancing system measures the distance from the optical distancing system to the various objects. In another example, the structured light device emits light onto objects and a camera captures images the structured light to determine distance based on the shape of the light in the captured images. The structured light may be infrared light or another light spectrum not visible to humans.

Figure 12:
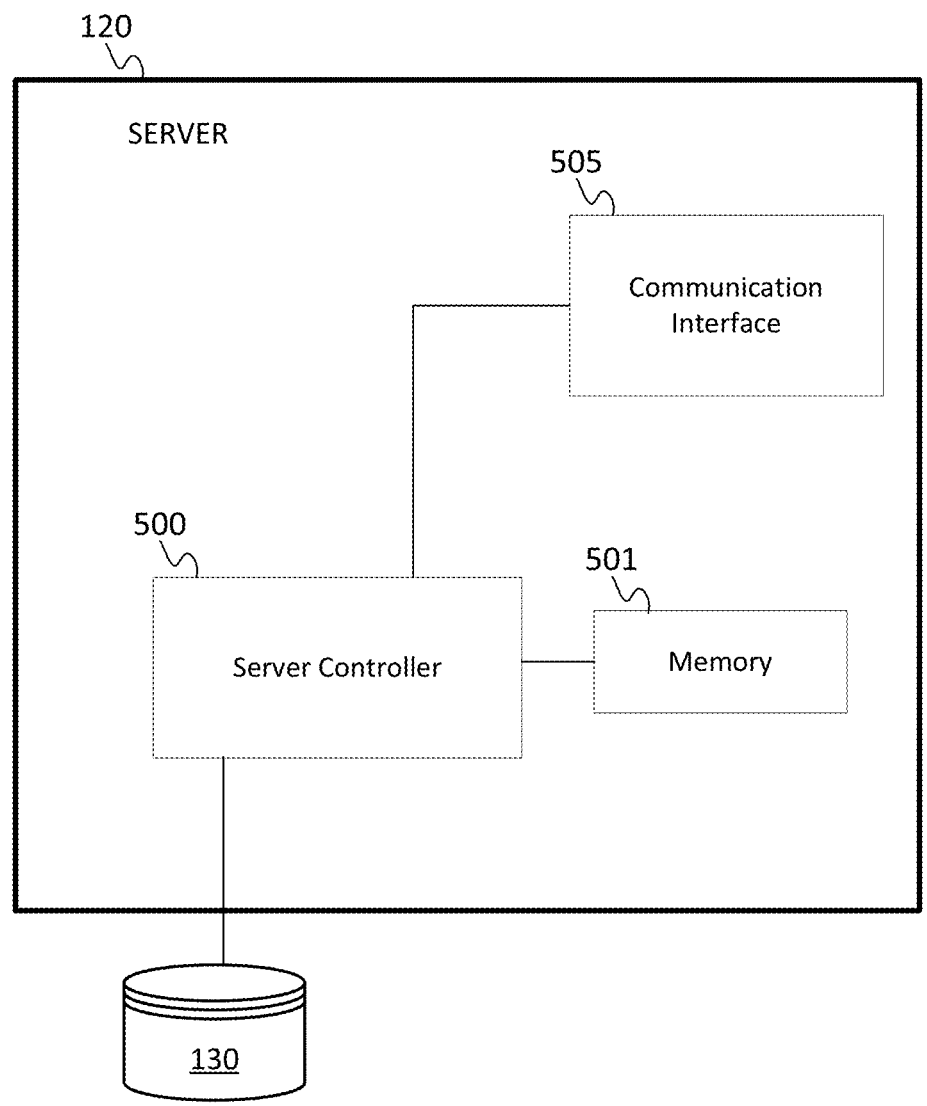
FIG. 12 illustrates a detailed view of the server of FIG. 2.
Figure 13:
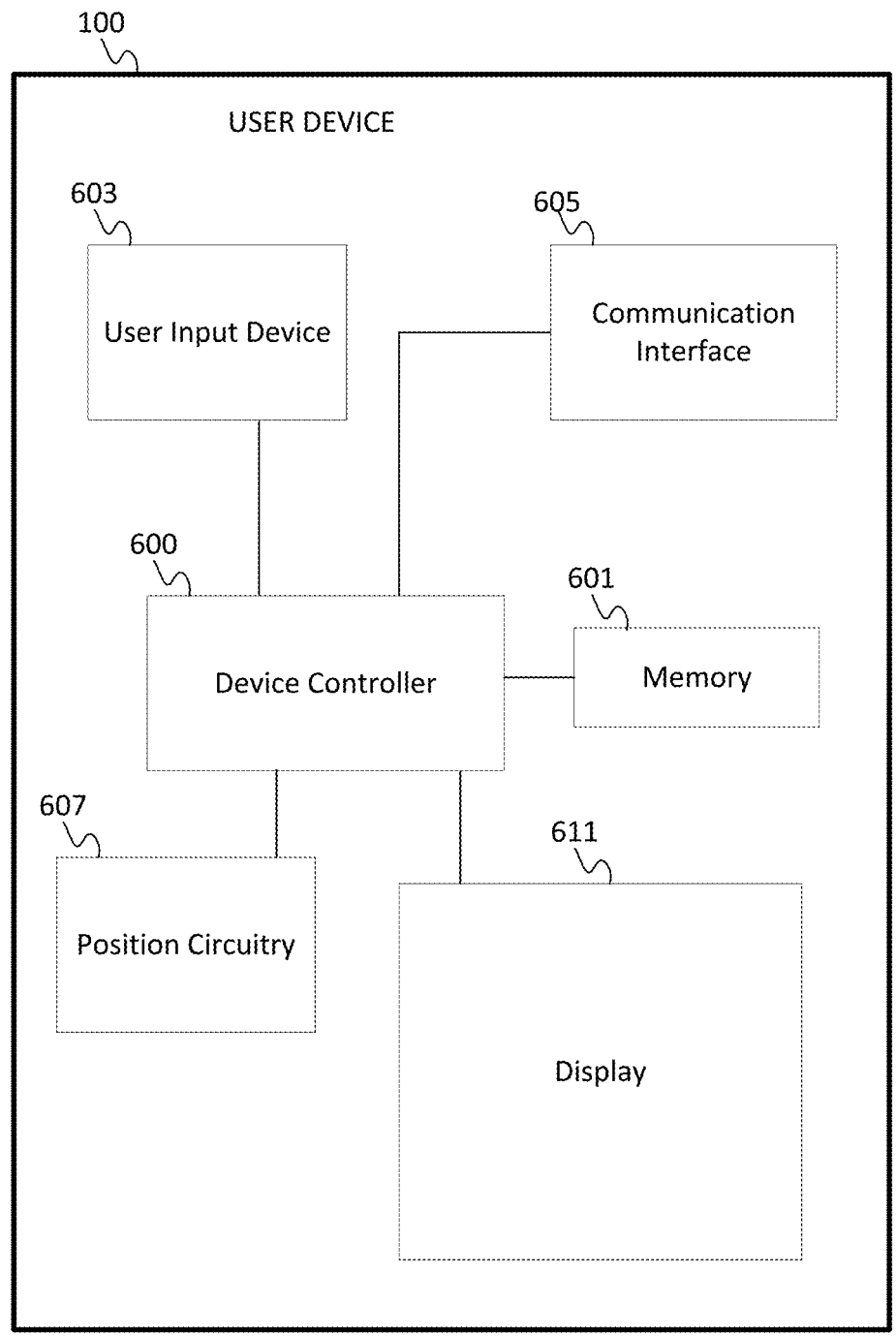
FIG. 13 illustrates a detailed view of the user device of FIG. 2.

FIG. 12 illustrates a detailed view of the server 120 of FIG. 2. The server 120 includes a server controller or circuitry 500, a memory 501, and a communication interface 505. The database 130 may be external or internal to the server 120. In the server-based embodiments, the server 120 is an apparatus for generating street side imagery. FIG. 13 illustrates a detailed view of user device 100 of FIG. 2. In the user device-based embodiments, the user device 100 is an apparatus for providing for routing in a panoramic image, such as routing giving a two-dimensional or three-dimensional like experience. The user device 100 includes a user device controller or circuitry 600, a memory 601, a communication interface 605, and position circuitry 607. The user device 100 may also include a user input device 603 and a display 611.

The database 130 is a memory configured to store optical data measured in three-dimensional geographic coordinates and image data from at least one image bubble. The server controller 500 or other computing device is configured to project the optical data onto at least one predefined two-dimensional plane and calculate a pixel value for a point of the optical data on the at least one predefined two-dimensional plane according to the image data. In other words, the server controller 500 utilizes the perspective of the image bubble and the geo-referenced location of the optical data to select a color or other graphical attribute for the corresponding point in the two-dimensional plane.

The server controller 500 may store the two-dimensional plane including the colorized optical data in database 130 in the format of an image file. The format may be a bit map, a portable network graphics (PNG) file, a lossy compression graphics file, or other format. The two-dimensional plane including the colorized optical data may be assigned to a navigation link or segment, point-of-interest (POI), location reference object (LRO), node, and/or another type of route/map data.

The route data may be calculated from an origin point to a destination point by the server controller 500 or externally. The route data includes nodes, which represent intersections or intersection points, and links or path segments, which connect the nodes. The route data may be stored in a geographic database (e.g., database 130) in a spatial format (e.g., Oracle spatial format), which is maintained by the map developer and compiled into a delivery format (e.g., geographical data file (GDF) format).

The route data may be defined by a routing algorithm based on a Dijkstra method, an A-star algorithm or search, and/or other route exploration or calculation algorithms. Various aspects, such as distance, non-navigable areas, costs, and/or restrictions, are considered to determine an optimum route. The routing algorithm may be specific to pedestrian routing. The routing algorithm may rank links or segments according to suitability for traversal by pedestrians. For example, links or segments may be classified according to a plurality of pedestrian modes, including walking, bicycle, and wheelchair.

The apparatus for generating street side imagery may operate with or without position data for the current location of the user device 100. When the position data is used in the server-based embodiments, the position circuitry 607 determines a current geographic position of the user device 100 and the communication interface 605 sends the current geographic position to the server 120. When the position data is used in the user-device based embodiments, the position circuitry 607 determines location data including the position and/or the orientation of the user device 100. The location data may be generated using one or more of a global navigation satellite system based on a satellite signal (such as Global Positioning System (GPS), the Russian GLONASS or European Galileo), a triangulation system that utilizes one or more terrestrial communication signals, a inertial position system based on relative position sensors such as gyroscopes, accelerometers, and altimeters, and/or a dead reckoning system based on a previously known position. The orientation may be determined using any of the above systems and/or a magnetic sensor such as a compass or a three-dimensional magnetic sensor array. Magnetic sensors determine the direction and/or strength of a magnetic field and can be used to determine heading or orientation. Inertial sensors such as accelerometers and gyroscopes measure acceleration, which can be used to calculate position, orientation, and velocity (direction and speed of movement) of the user device 100. The location and/or orientation data may be used to select the navigation segment associated with the two-dimensional plane from the database 130.

In the user device-based embodiments, the memory 601 is configured to store The optical data measured in three-dimensional geographic coordinates and image data from at least one image bubble. The device controller 600 may be configured to project the optical data onto at least one predefined two-dimensional plane and calculate a pixel value for a point of the optical data on the at least one predefined two-dimensional plane according to the image data using the algorithms discussed above.

The predefined two-dimensional plane is converted to a format similar to an image. The image may be stored in memory 601 and displayed on display 611. The device controller 600 may generate an image file from the predefined two-dimensional plane and associate the image file with a navigation segment (the navigation segment may refer to data representing a road or path segment in a map database, a portion of a navigation route, and or any other geographical/navigation/map area or object). The user input device 603 is configured to receive a command indicative of the navigation segment. The command could be in response to the calculation of a route or route data. Alternatively, the command could be in response to selection of an address, a point of interest, a selection on a digital map, or manual selection of an image bubble.

The display 611 is configured to display street side imagery from the image file in response to the command. The display 611 may be combined with the user input device 603 as a touch screen, which may capacitive or resistive. In addition, the user input device 603 may include one or more buttons, keypad, keyboard, mouse, stylist pen, trackball, rocker switch, touch pad, voice recognition circuit, or other device or component for inputting data to the navigation device 100. The display 611 may be a liquid crystal display (LCD) panel, light emitting diode (LED) screen, thin film transistor screen, or another type of display.

The user device controller 600 or server controller 500 may include a general processor, digital signal processor, an application specific integrated circuit (ASIC), field programmable gate array, analog circuit, digital circuit, combinations thereof, or other now known or later developed processor. The user device controller 600 or server controller 500 may be a single device or combinations of devices, such as associated with a network, distributed processing, or cloud computing.

The memories 501, 601 may be a volatile memory or a non-volatile memory. The memory 501, 601 may include one or more of a read only memory (ROM), random access memory (RAM), a flash memory, an electronic erasable program read only memory (EEPROM), or other type of memory. The memory 501, 601 may be removable from the user device 100, such as a secure digital (SD) memory card.

The communication interfaces 505, 605 may include any operable connection. An operable connection may be one in which signals, physical communications, and/or logical communications may be sent and/or received. An operable connection may include a physical interface, an electrical interface, and/or a data interface. The communication interfaces

505, 605 provides for wireless and/or wired communications in any now known or later developed format.

In an alternative embodiment, the user device 100 may omit the position circuitry 607 or use of the position circuitry 607. In this alternative embodiment, the user device 100 may be a personal computer, which encompasses laptops and other mobile processing platforms.

Figure 14:
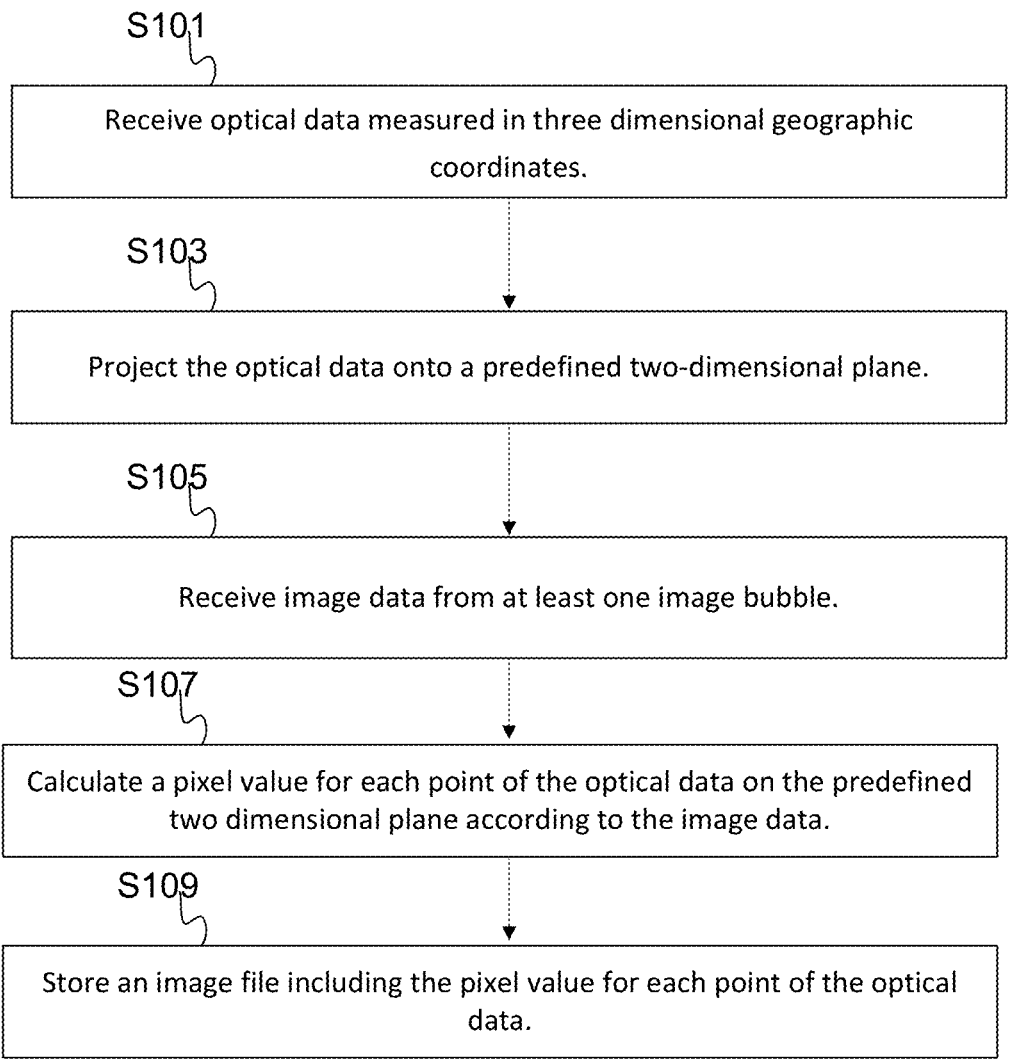
FIG. 14 illustrates a flowchart for generating street side imagery.

FIG. 14 illustrates a flowchart for generating path/street side imagery. Fewer, more, or different steps or acts may be provided, and a combination of steps may be provided. Also, the steps or acts may be performed in the order as shown or in a different order. The method is implemented by the system and/or devices described herein or by different devices or systems. One or more steps or processes of the method may be fully or partially automated (such as via a computer, processor, and/or algorithm).

At act S101, optical data measured in three-dimensional geographic coordinates by the optical distancing system are received. The optical data may be received from the optical distancing system or received from memory at the controller, which alternately refers to either the server controller 500, the device controller 600, or another controller or computing device.

At act S103, the controller projects the optical data onto one or more predefined two-dimensional planes. In the case of multiple planes, a distance range may be applied to each plane. The controller may set the distance ranges according to a user setting, according to predetermined distances, or according to a statistical analysis of the optical data. The statistical analysis may define the distance ranges such that an equal amount of optical data is projected onto each plane. Alternatively, the statistical analysis may identify trends or objects in the optical data (e.g., a curb or building facade).

At act S105, the controller receives image data from at least one image bubble. The image bubble may be selected according to the geo-referenced location of the optical data. The at least one image bubble may be several image bubbles. For example, the image bubbles may be selected based on proximity such as the two closest, five closest, or ten closest image bubbles. Pixel values are retrieved from each of the image bubbles at the angle that corresponds to individual data points of the optical data.

At act S107, the controller calculates a pixel value for a point of the optical data on the at least one predefined two-dimensional plane according to the image data. In other words, the image data of the image bubble that corresponds to the point of the optical data is inserted into the two-dimensional plane where the point of the optical data was projected onto the two-dimensional plane. In one example, the image data colorizes the two-dimensional plane.

The controller may select a plurality of pixel values in the image data. The plurality of pixel values may be a predetermined number of pixels or the number of pixels may be based on a density of the optical data in an area surrounding the point of the optical data. For lower densities of the optical data, more pixels in the image bubble correspond to the point in the optical data. The plurality of pixel values may be averaged to calculate the pixel value for the point of the optical data.

For example, an 'inpainting' algorithm may be used to fill spaces or holes between points. The inpainting algorithm may include blurring or diffusion techniques. For example, the inpainting algorithm may determine a pixel value for a particular pixel by averaging pixel values of neighboring pixels. When the spaces or holes span more than one optical data point or pixel, the inpainting algorithm may be repeated such that previously blurred/diffused pixels are averaged to determine a subsequent pixel value.

The pixel value may be a color value (e.g., RGB value) or the pixel value may have multiple components. The multiple components may include one or more of a hue, a brightness, a luminance, or an intensity of the pixel.

The controller may calculate the pixel value for the two-dimensional plane from a plurality of pixel values across a plurality of image bubbles. The pixel values from the plurality of image bubbles may be averaged. Alternatively, the pixel values from the plurality of image bubbles may be analyzed by the controller to identify one or more outliers. The outliers may represent an obstruction in one image bubble corresponding to the point of the optical data that is not present in the same location in other image bubbles. The outlier may be removed before averaging the pixel values. The outlier may be identified according to variance or standard deviations. Alternatively, the largest and/or smallest pixel values may be omitted as outliers.

Depending on the size, shape, and orientation of objects in the optical data, the points that are projected onto the two-dimensional plane may overlap. The final pixel values in the image file may modified according to the number of overlapping points. For example, the brightness of the pixel may be increased proportional to the number of overlapping points. In addition, each pixel may be weighted according to the original reflectivity in the optical data. When the pixel values are weighted according to reflectivity, dense features such as edges show up as bright areas in the images. Such a technique may be used to highlight windows, doors, poles, signs, or other objects and enable easier automatic detection through image processing.

At act S109, the controller stores at least one image file including the pixel value for each point of the optical data. In addition, the controller may assign the at least one image file to a navigation link or segment or other map/navigation object, such as a node or POI. The at least one image file and assignment may be stored in the database 130. In the case of multiple two-dimensional planes, the at least one image file may include a plurality of image files such that each image file corresponds to one of the plurality of predefined two-dimensional planes.

The controller may output a subset of the plurality of image files either to a display 611 in the user device-based embodiments or from the server 120 to the user device 100 in the server-based embodiments. The subset may be selected based on a configuration setting defined by a range of distance values. The subset may be selected based on an analysis of the optical data. The subset may be selected based on a navigation feature detected by the controller in the optical data. The navigation feature may be a road surface, a curb, a building facade, or other man-made or natural geographic feature.

In an alternative embodiment, the image bubbles are not used to colorize the optical data projected onto the two-dimensional plane. In this embodiment, the optical data includes LIDAR reflectivity as the street side imagery. The street side imagery comprising LIDAR reflectivity has no natural lighting, no shadows, and may be collected in complete darkness. The street side imagery comprising LIDAR reflectivity highlights the architectural details of the building facade. Alternatively, differences of surrounding depth values may be used to generate an edge style street side imagery.

Alternatives

The embodiments described above have been described substantially in terms of street/path views. However, the embodiments herein may be applied to indoor environments and other types of pathways, such as indoor pathways, hallways, and office settings. The indoor environment may be surveyed in three-dimensional geographic coordinates to generate the optical data. The optical data may be created using any arbitrary viewpoint or perspective in the indoor environment. For example, shopping malls, pedways, and office buildings have pathways central to locations or points of interest within the indoor environment. The optical data may include geo-coordinates such as latitude, longitude, and altitude for each of plurality of points based on an IMU and/or GPS, as described above.

The optical data may be projected onto at least one predefined two-dimensional plane parallel to the pathway and/or the direction of movement of the optical distancing system as the optical data is collected. The predefined two-dimensional plane may be selected to estimate a storefront or office facade along the pathway. Image data from at least one panoramic image or image bubble, collected by a camera, may be associated with the storefront or office facade and referenced in another coordinate system. The image data of the image bubble is correlated with the geo-referenced three-dimensional space of the optical data. The two-dimensional plane is colorized or otherwise modified based on the image data. The two-dimensional plane is stored as an image file, which can be stored in a map or geographic database to simulate the view of a pedestrian from the pathway. Alternatively, the image file may be associated with a navigation link or segment corresponding to the pathway.

The embodiments described above including multiple layers of street/path side imagery include layers divided horizontally. Horizontal layers are defined by distances in the horizontal direction. The embodiments described above could alternatively or additionally include vertical layers defined by distances in the vertical direction. For example, the optical data may be projected onto a plurality of vertical planes defined by a user or automatically. The user may define one or more vertical thresholds. The vertical distance may be measured from the collection point of the optical data and/or the collection point of the image bubble. Alternatively, the vertical planes may be defined automatically. For example, the vertical planes may be selected according to the values of the optical data such that the optical data is divided evenly according to distance. Each optical data point may be projected onto the closest vertical plane. In another example, an image processing algorithm may define the planes according to trends in the optical data identifying navigation features in the optical data. The navigation features may include one or more of a building facade, a storefront, a doorway, a door, a window, or another feature.

The street/path side imagery is divided into a layer for each of the vertical planes. A first layer includes points with pixel values selected from one or more image bubbles according to the optical data projected onto a first plane. For example, the first layer may include objects closest vertically to the perspective of the street/path side imagery. The second layer includes points with pixel values selected from one or more image bubbles according to the optical data projected onto a second plane. In an outdoor environment, the first layer may include the lower building facade, and the second layer may include the tops of buildings. In an indoor environment, such as a shopping mall, the first layer may include storefronts on the first floor and the second layer may include storefronts on the second floor. In another example, the plurality of planes may be spherically shaped and defined by a threshold radius from the collection point of the optical data and/or the collection point of the image bubble.

The embodiments described above may be implemented using computer executable instructions stored in the memory 501, the memory 601, and/or other memory, which are non-transitory. The processors may execute computer executable instructions. The computer executable instructions may be written in any computer language, such as C++, C#, Java, Pascal, Visual Basic, Perl, HyperText Markup Language (HTML), JavaScript, assembly language, extensible markup language (XML) and any combination thereof.

The computer executable instructions may be logic encoded in one or more tangible media or one or more non-transitory tangible media for execution by the processors. Logic encoded in one or more tangible media for execution may be defined as instructions that are executable by the processors and that are provided on the computer-readable storage media, memories, or a combination thereof. Instructions for instructing a network device may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The computer readable instructions may be stored on any non-transitory computer readable medium. A non-transitory computer readable medium may include, but are not limited to, a floppy disk, a hard disk, an ASIC, a compact disk, other optical medium, a random access memory (RAM), a read only memory (ROM), a memory chip or card, a memory stick, and other media from which a computer, a processor or other electronic device can read.

As used herein, the phrases "in communication" and "couple" are defined to mean directly connected to or indirectly connected through one or more intermediate components. Such intermediate components may include both hardware and software based components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The embodiments described above may be combined with systems and methods for generating a map including path side data as described in copending application "PATH SIDE IMAGE ON MAP OVERLAY" by James D. Lynch, filed Dec. 30, 2011 Ser. No. 13/341,152, which is incorporated by reference in its entirety.

Various embodiments described herein can be used alone or in combination with one another. The foregoing detailed description has described only a few of the many possible implementations of the present invention. It is intended that the foregoing detailed description be regarded as illustrative rather than limiting and that it is understood that the following claims including all equivalents are intended to define the scope of the invention.

I claim:

1. A method comprising:
    receiving optical data measured in three-dimensional geographic coordinates using an optical distancing system and collected along a path;
    projecting, using a controller, the optical data onto three or more predefined two-dimensional planes, wherein the three or more predefined two-dimensional planes are defined by different horizontal distance ranges from the path;
    receiving image data from at least one panoramic image collected along the path, the image data including spherical coordinates;
    mapping, using the controller, the spherical coordinates of the image data to the geographical coordinate space of the optical data;
    determining, using the controller, a pixel value for a point of the optical data on the three or more predefined two-dimensional planes by selecting a pixel in the mapped image data having a three-dimensional geographic coordinate corresponding to the three-dimensional geographic coordinate of the point of the optical data;
    defining three or more images, wherein each image includes pixel values for one of the three or more predefined two-dimensional planes;
    selecting two or more of the three or more images; and
    providing the two or more images to a map application, wherein the map application overlays the two or more images to create a pathway view.

2. The method of claim 1, wherein
    selecting the two or more images is based on a configuration setting including data indicative of the distance ranges for the predefined two-dimensional planes.

3. The method of claim 1, wherein
    selecting the two or more images is based on an analysis of the optical data.

4. The method of claim 1, further comprising:
    detecting a navigation feature in the optical data, wherein selecting the two or more images is based on the navigation feature.

5. The method of claim 4, wherein the navigation feature is at least one of a road surface, a curb, a storefront, a door, a doorway, a window, or a building facade.

6. The method of claim 1, wherein determining the pixel value for the point of the optical data on the three or more predefined two-dimensional planes according to the image data further comprises:
    selecting a plurality of pixel values in the image data based on a density of the optical data in an area surrounding the point of the optical data; and
    averaging a plurality of pixel values in the image data to calculate the pixel value for the point of the optical data.

7. The method of claim 1, wherein determining the pixel value for the point of the optical data on the three or more predefined two-dimensional planes according to the image data further comprises:
    averaging a plurality of pixel values across a plurality of panoramic images.

8. The method of claim 7, further comprising:
    identifying an obstruction in at least one of the plurality of panoramic images corresponding with the point in the optical data; and
    omitting the at least one of the plurality of panoramic images having the obstruction in the calculating of the pixel value for the point of the optical data.

9. The method of claim 1, wherein the optical distancing system is a light detection and ranging (LIDAR) system.

10. The method of claim 1, wherein as the map application scrolls along the pathway view, the selected two or more images scroll at different speeds.

11. An apparatus comprising:
    a memory configured to store optical data measured in three-dimensional geographic coordinates and generated by an optical distancing system along a road and configured to store image data measured in spherical coordinates from at least one image bubble; and
    a controller configured to project the optical data onto a plurality of predefined two-dimensional planes according to horizontal distance ranges from the road and configured to map the spherical coordinates of the image data to the geographic coordinates of the optical data using a vector based function, and configured to calculate a pixel value for a point of the optical data on the plurality of predefined two-dimensional planes by selecting a pixel in the mapped image data having a three-dimensional geographic coordinate corresponding to the three-dimensional geographic coordinate of the point of the optical data,
    wherein each of the plurality of predefined two-dimensional planes corresponds to one of a plurality of layers of a street side imagery, and wherein a command further indicates which of the plurality of layers is to be displayed with the street side imagery, wherein as the street side imagery is scrolled, each layer of the plurality of layers scrolls at a different speed.

12. The apparatus of claim 11, wherein the controller is configured to associate an image file including the plurality of predefined two-dimensional planes with a navigation segment.

13. The apparatus of claim 12, further comprising:
    an input device configured to receive the command, wherein the command is indicative of the navigation segment; and
    a display configured to display the street side imagery from the image file in response to the command.

14. The apparatus of claim 11, wherein the plurality of layers includes a plurality of layers defined by a respective distance range determined from an analysis of the optical data.

15. The apparatus of claim 11, wherein the optical data is generated from a light detection and ranging (LIDAR) system or a system that emits structured infrared light.

16. A non-transitory computer readable medium having stored thereon a computer program, the computer program comprising instructions to cause a processor to:
    receive optical data measured in three-dimensional geographic coordinates and generated by an optical distancing system along a road;
    project the optical data onto three or more predefined two-dimensional planes defined by horizontal distance ranges from the road;

receive first image data from a first captured image bubble, the first image data containing spherical coordinates;

receive second image data from a second captured image bubble, the second image data containing spherical coordinates;

map the spherical coordinates of the first image data to the geographical coordinate space of the optical data;

map the spherical coordinates of the second image data to the geographical coordinate space of the optical data;

select pixel values for the optical data on the three or more predefined two-dimensional planes by selecting a pixel in the mapped image data having a three-dimensional geographic coordinate corresponding to a three-dimensional geographic coordinate of a point of the optical data, wherein when there is no mapped first or second image data for a pixel, a diffusion technique is used to select the pixel value;

define three or more images, wherein each image includes the pixel values for one of the three or more predefined two-dimensional planes;

select two or more images from the three or more images; and provide the two or more images to a map application, wherein the map application overlays the two or more images to create a pathway view, wherein as the map application scrolls along the pathway view, the two or more images scroll at different speeds.

17. The non-transitory computer readable medium of claim 16, the program further comprising instructions to:
output a subset of the three or more predefined two-dimensional planes based on a statistical analysis of the optical data or a user selection.

18. The non-transitory computer readable medium of claim 16, the program further comprising instructions to:
average a plurality of pixel values across a plurality of image bubbles;
identify an obstruction in at least one of the plurality of image bubbles corresponding with the point in the optical data; and
omit the at least one of the plurality of image bubbles having the obstruction in calculation of the pixel value for the point of the optical data.

\* \* \* \* \*